Dec. 16, 1969  D. S. WYSE  3,484,736
QUICK DISCONNECTOR
Filed Jan. 20, 1967
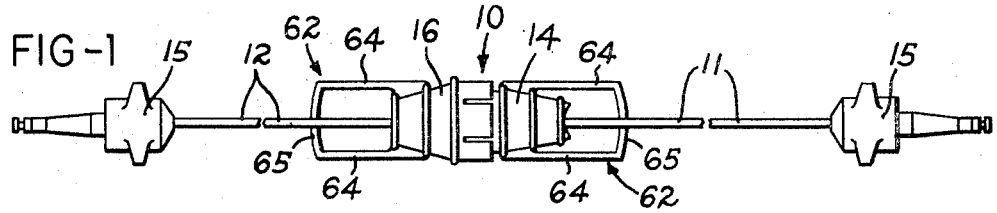
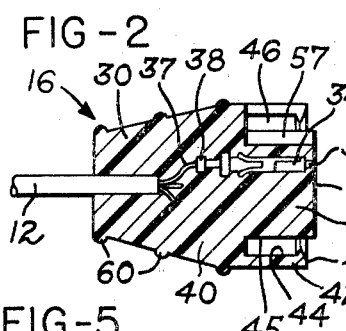
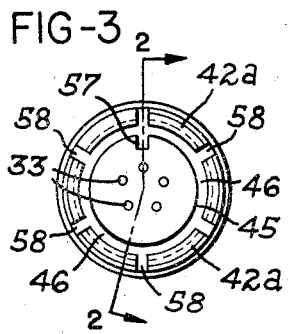
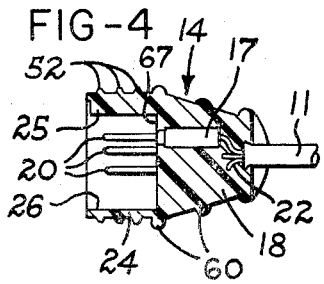
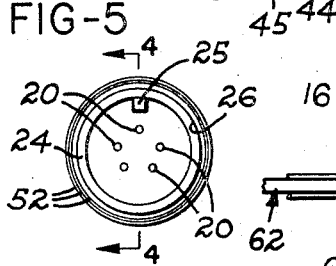
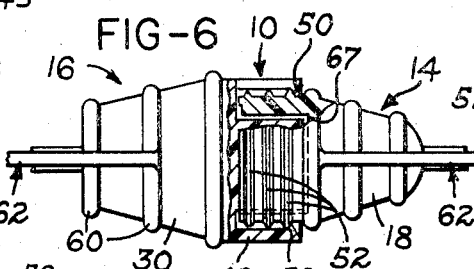
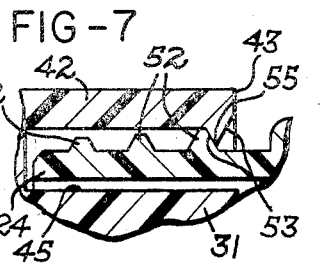
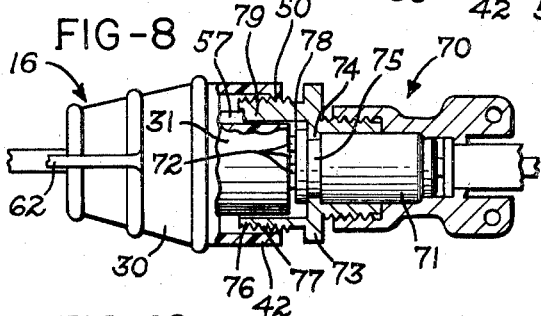
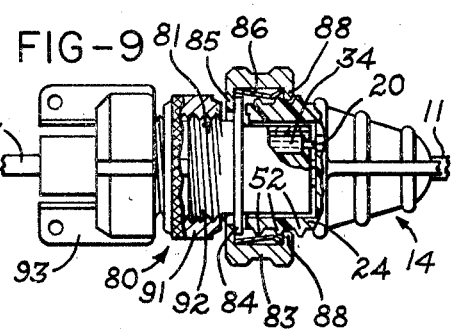
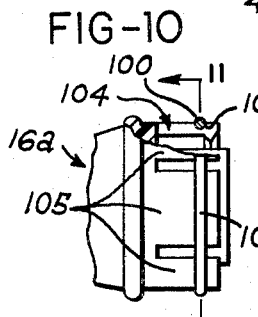
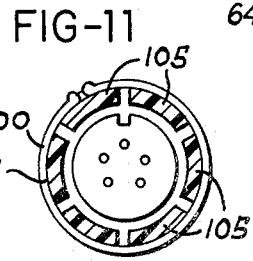
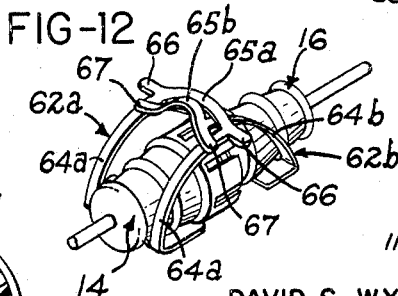
INVENTOR
DAVID S. WYSE
BY Marechal, Biebel, French & Bugg
ATTORNEYS

# United States Patent Office 3,484,736
Patented Dec. 16, 1969

3,484,736
QUICK DISCONNECTOR
David S. Wyse, % Projects Unlimited, 1926 E.
Siebenthaler Ave., Dayton, Ohio 45414
Filed Jan. 20, 1967, Ser. No. 610,522
Int. Cl. H01r 11/02, 21/28
U.S. Cl. 339—61
3 Claims

ABSTRACT OF THE DISCLOSURE

A cable assembly having an improved plastic male or female connector on the other portion thereof adapted to easily engage and disengage the standard threads of the mating connector without turning by reason of the resilience of the plastic material.

BACKGROUND OF THE INVENTION

Heretofore, both private business and the military services have been using all metal connectors adapted to secure two electrical connectors together. In many aircraft and aerospace systems, it is necessary to have an automatic disconnect capability when a preset tension is supplied to the connectors. For example, when a small guided missile is to be fired from an aircraft or a booster rocket is to be detached and jettisoned during the launch of a space craft, the electrical connectors must easily disconnect as the separation is made.

In the prior art devices, both sections were made of complex metal components requiring specially designed springs to engage the threaded surface of a standard male component to permit the necessary disconnect. These various metal connectors require a number of separate components each of which included a plurality of machining operations. Thus the cost was high, the weight was comparatively heavy, and the devices were subject to corrosion if not properly protected by paint or coatings.

SUMMARY OF THE INVENTION

Accordingly, this invention is directed to an improved cable assembly which includes a male and female connector made of plastic and having an annular retainer portion adapted to engage each other or the threads on the conventional metal male or female connector. A preset amount of frictional force is applied by the retainer to the threads so that the connectors cannot be separated except when a preset force is applied axially thereto. In a second form of the invention, a metallic snap ring is embedded in the retainer portion to add additional strength to the retainer.

BRIEF DESCRIPTION OF THE DRAWINGS

FIG. 1 is a plan view of a cable assembly including the quick disconnect connector of the invention;

FIG. 2 is a cross-sectional view through the quick disconnect connector taken along the line 2—2 of FIG. 3;

FIG. 3 is an end view of the connector of FIG. 2;

FIG. 4 is a sectional view taken along the line 4—4 of FIG. 5;

FIG. 5 is an end view of the male connector;

FIG. 6 is an enlarged plan view of the connectors partially broken away to show the manner in which they interconnect;

FIG. 7 is an enlarged fragmentary view illustrating the interconnected male and female connectors;

FIG. 8 is a view similar to FIG. 6 but showing the female connector mating with a standard male connector;

FIG. 9 is a view similar to FIGS. 6 and 8 but showing the male connector mating with a standard female connector;

FIG. 10 is an elevation view, partially broken away, of another embodiment of the female connector;

FIG. 11 is a sectional view taken along the line 11—11 of FIG. 10; and

FIG. 12 is a perspective view of another embodiment of the invention.

Referring to the drawings wherein preferred embodiments of the invention are shown, FIG. 1 illustrates a cable assembly 10 which includes two sections 11 and 12 of conductors, one having a male connector 14 on one end thereof and a standard plug member 15 on the other end thereof. The other section 12 has the female connector 16 secured or molded on one end thereof and adapted to engage the male connector 14, and also a plug member 15 secured on the other end of the conductor 12.

Referring to the male connector which is shown best in FIGS. 4 and 5, the plug members 17 are molded into the plastic body 18 and include the male pins 20 which project therefrom and the electrical wires 22 which are secured thereto and form the conductor 11. A tubular portion 24 is formed with the plastic body 18 and extends axially therefrom a distance greater than the length of the male pins 20 so that these pins are substantially protected from contact which might deform the pins or otherwise interfere with the alignment thereof. An alignment projection 25 is provided on the inside surface 26 of the tubular portion 24 to aid in alignment with the female connector 16, as will be seen.

Referring now to the female connector 16 which is also an important part of the invention, FIGS. 2 and 3 illustrate the solid body 30 which is formed of plastic material, and has the integral cylindrical portion 31 which projects axially from the right-hand end of the body 30, as shown in FIG. 2. This cylindrical section has a flat surface 32 on the outer end thereof having a plurality of small openings 33 therein. The female pins 34 are molded into the body 30 and extend into the cylindrical portion 31 in alignment with the openings 33 so that the male pins 20 can be received therein. The precise spacing of the pins 34, as well as the openings 33, is important so that they easily receive the male pins 20. The female pins 34 are standard "closed entry" type. An electrical wire 37 is secured to the base 38 of each of the pins 34 and passes into the conductor 12 which projects from the left-hand end of the body 30.

A shoulder portion 40 tapers radially outward from the body 30 and has the axially extending annular retainer 42 integrally formed therewith and extending circumferentially around the cylindrical portion 31. The length of the retainer 42 is such that the end surface 43 thereof is spaced inwardly from the flat surface 32, and the inner surface 44 is spaced a preset distance from the outer surface 45 of tthe cylindrical portion 31 so that the size and location of the space 46 therebetween is carefully controlled.

As shown best in FIG. 7, the locking projection 50 extends radially inwardly from the outermost periphery 43 of the retainer 42 for engaging one of the external annular rings 52 on the tubular portion 24 of the male connector 14. The rings 52 have diameters which are gradually increased from left to right in FIG. 7 so that the larger diameters offer increased holding force on the projection 50. The projection 50 has a tapered surface 53 on each side thereof to permit the retainer 42 to be cammed upwardly and ride over the rings 52 when the female connector is being placed onto or removed from the male connector 14. Similarly, this apex 55 of projection 50 readily engages the threads of a standard male connector, as will be seen. An axial groove 57 is provided in the outside surface of the cylindrical portion 31 to receive the alignment projection 25 so that the pins 20 and 34 are always properly aligned when the male and female connectors 14 and 16 are placed together.

The retainer 42 has a plurality of axially extending slots 58 cut axially through the end surface 43 to the shoulder 40 to thus form a series of separate sections 42a which make the retainer more resilient. These slots provide for easier separation of the male and female connectors 14 and 16, and the number thereof can be varied depending upon the force desired to engage the female connector 16.

A plurality of radial projections 60 surround the bodies 22 and 30 of the connectors 14 and 16 and provide for easy grasping thereof for manual separation of the connectors 14 and 16. Also, a lanyard 62 (FIG. 1) may also be provided on the male and female connectors to facilitate handling thereof including the separation. Each of these lanyards has the integral elongated side end members 64 and 65 with the side members being molded to the bodies. However, it is within the scope of the invention to eliminate this lanyard or to use other means to provide for handling of the connectors.

As shown in the embodiment of FIG. 12, the lanyards 62a and 62b can be modified to provide an additional locking mechanism for holding the male and female connectors 14 and 16 together. In the FIG. 12 embodiment, the outwardly extending ears 66 and 67 are provided on the end members 65a so that one of the lanyards 62a can be secured to the other lanyard 62b by deforming the end member 65b of the lanyard 62b and inserting it through the loop of the other lanyard 62a so that the ears 67 engage the side members 64a of the lanyard 62a. In this manner the connectors 14 and 16 are held together against separation. This embodiment would be utilized in an environment where the quick disconnect feature is not required since, before the connectors 14 and 16 can be separated, the lanyards 62a and 62b must be separated.

To interconnect the male and female connectors 14 and 16, it is merely necessary to align the groove 57 in the cylindrical portion 31 of the female connector 16 with the complementary projection 25 on the tubular portion 24 of the male connector 14 and force the two connectors together. The alignment of the groove 57 and projection 25 automatically aligns the male pins 20 with the openings 33 and the female pins 34 so that they are forced together until the flat end surface 32 on the cylindrical portion 31 engages the wall 67 of the body 18, as shown in FIG. 6.

At the same time, the tubular portion 24 is forced into the groove 46 with the resilient retainer 42 being deformed radially outwardly as the projection 50 cams itself over the rings 52. As the projection 50 passes over the last ring 52 the two connectors are locked together. As a result, the connectors 14 and 16 cannot be easily disengaged unless a preset axial force is applied to separate them, either manually or by jettisoning a component to which one portion of the assembly 10 is connected. The axial force of separation must be sufficient to overcome the frictional engagement between the projection 50 of the retainer 62 and the rings 52, as well as the small amount of friction between the pins 20 and 34.

Referring now to FIG. 8, the female connector 16 described above is utilized with a standard metal male connector 70. This male connector includes the central member 71 which is molded around and supports the male pins 72 in a preset alignment. The left-hand member 73 is secured to the central member 71 by the projection 74 which fits into the groove 75 and the tubular portion 76 thereof projects beyond the ends of the male pins 72 and has the external threads 77 thereon. Normally these threads engage a suitable coupling to secure the two standard connectors together. However, in this invention the inner cavity 78 defined by the tubular portion 76 snugly receives the projection 31 having female pins 34 thereon which receive the male pins. A projection 79 is provided on the inside surface of the tubular portion 76 to engage the alignment groove 57 in the female connector. The internal projection 50 on the retainer 42 engages the threads 77 and cams over them until the connectors 16 and 70 are fully mated at which point they are held releasably together by the engagement between the projection 50 and the threads 77.

Referring now to FIG. 9, the male connector 14 is described above is utilized with a standard all metal female connector 80. This standard connector 80 includes the central member 81 which is molded around the female pins 34 to secure them in alignment in the central projection 31. The retainer 83 is secured on the central member 81 by the radial flange 84 which engages the inner flange 85 of the retainer 83. The resilient spring 86 is provided between the internal flanges 85 and 88 on the retainer 83 for engaging the threads of a standard connector or the projections 52 of the plastic connector 14 described above.

The projection 31 is thus received within the male connector 14 with the pins 20 and 34 mating. These connectors 14 and 80 are held together by the retainer 83 which engages the annular rings 52 on the outer surface of the tubular portion 24 of the connector 14. The retainer 14 is also held on the central member 81 by the intermediate nut 91 which engages the threads 92, and a lanyard connector 93 is also secured to the member 81 by the threads 92.

Another embodiment 16a of the invention is shown in FIGS. 10 and 11 which is substantially identical to that described above in connection with FIGS. 1–5, except that a metallic snap ring 100 is provided in an external groove 101 near the right-hand end of the retainer 104. The spring 100 is resilient and provides additional reenforcement to the sections 105 of the retainer 104 while also permitting the necessary flexing required for interconnection with the male connector. As a result, more pressure can be exerted by the retainer 104 on the projections 52 or the threads 92 thus making it more difficult to separate the connectors, a feature which will be desirable in some installations.

As indicated above, the male and female connectors 14 and 16 are made of a suitable plastic material which will provide the necessary insulation, strength, and resilience to effect the operation as herein set forth. One material which works satisfactorily is polypropylene plastic, but it must be understood that other plastic materials can be used without departing from the scope of the invention.

The invention has thus provided an improved cable assembly wherein the male and female connectors are made entirely of plastic and easily engage each other or conventional metal connectors. The plastic material is lighter, non-corrosive and less expensive than the heretofore used metal components, and the retainer frictionally engages the projection or threads without any rotation of either connector so that vibration and normal shocks cannot separate the connectors, while permitting a preset axial force to separate them. In another form of the invention, a snap ring is provided to increase the biasing effect of the retainer.

While the forms of apparatus herein described constitute preferred embodiments of the invention, it is to be understood that the invention is not limited to these precise forms of apparatus, and that changes may be made therein without departing from the scope of the invention.

What is claimed is:
1. In a quick release electrical connector including
   a male connector having a body with at least one conductor pin, a surrounding protective tubular portion extending beyond the end of said pin, and screw threads on the external surface of said tubular portion providing a plurality of ridges generally transverse to the length thereof, a female connector including a cable with at least one conductor wire and a body of resilient electrically insulating material molded to the end of said cable and terminating in a circular face, with a pin receiving opening, at least one female pin receiving member molded into said female connector body in alignment with said pin receiving opening terminating behind said face and connected to said conductor wire, said female connector body having an integral cylindrical portion surrounding said female pin receiving member and dimensioned to fit closely within said tubular portion of said male connector body, the improvement comprising a releasable retainer integrally formed with said female connector body, said retainer including a plurality of flexible fingers extending generally parallel to said cylindrical portion and spaced outwardly therefrom by a distance slightly greater than the thickness of said tubular male body portion, and generally V-shaped projections extending inward from the ends of said fingers toward said cylindrical portion to engage said ridges on said tubular portion when said pin is engaged with said pin receiving member.

2. A cable assembly as defined in claim 1 wherein a loop shaped lanyard is integrally formed on both said male and female connectors, said lanyard being flexible and defining a loop, ears on the ends of said lanyards for interlocking said lanyards when one lanyard is placed through the loop of the other lanyard.

3. A cable assembly as defined in claim 1 wherein said male connector is a conventional metal design connector with metallic screw threads, said threads adapted to be engaged frictionally by said V-shaped projections without requiring rotation of said connectors and to provide a preset force thereto to hold said connectors together.

References Cited

UNITED STATES PATENTS

| | | | |
|---|---|---|---|
| 1,686,780 | 10/1928 | Wigginton | 281—25 |
| 2,132,950 | 11/1938 | Green | 85—4 |
| 770,982 | 9/1904 | Plassman | 285—114 |
| 1,297,719 | 3/1919 | Myers | 285—322 |
| 2,877,437 | 3/1959 | Flanagan. | |
| 2,958,844 | 11/1960 | Smith et al. | 339—89 |
| 3,044,037 | 7/1962 | Honig | 339—89 |
| 3,133,777 | 5/1964 | Anhalt | 339—91 |
| 3,181,105 | 4/1965 | Roach et al. | 339—94 |
| 3,208,033 | 9/1965 | Blonder | 339—177 |
| 3,266,009 | 8/1966 | Jensen et al. | |
| 3,277,423 | 10/1966 | Rose. | |

FOREIGN PATENTS

| | | |
|---|---|---|
| 1,159,095 | 2/1958 | France. |
| 295,389 | 4/1965 | Netherlands. |
| 6,405,509 | 11/1965 | Netherlands. |

RICHARD E. MOORE, Primary Examiner

J. H. McGLYNN, Assistant Examiner

U.S. Cl. X.R.

285—114, 322; 339—75, 91, 218